(No Model.)
A. BOOTHROYD.
Arrangement of Shafts and Pulleys.
No. 242,256. Patented May 31, 1881.
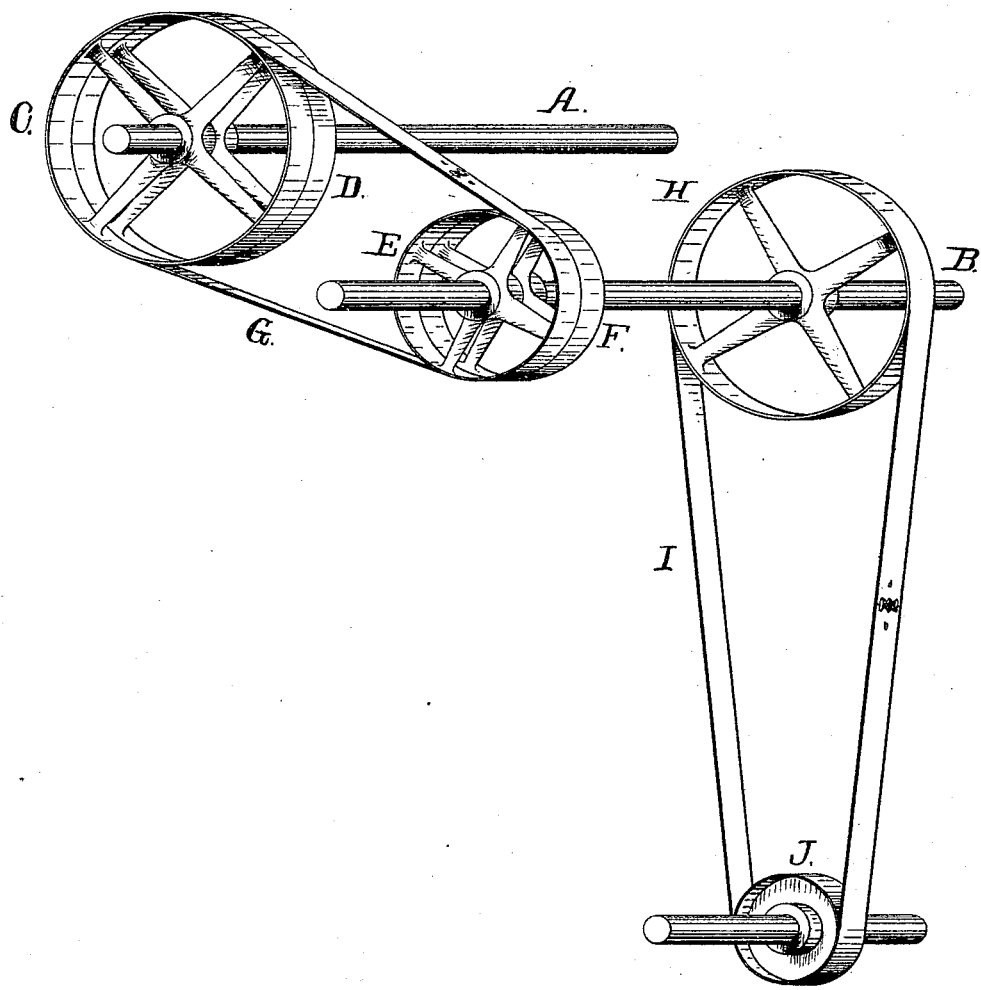
Witnesses.
G. M. Carpenter
John J. Eaton
Inventor.
Abel Boothroyd
By Walter B. Vincent Atty.

UNITED STATES PATENT OFFICE.

ABEL BOOTHROYD, OF PROVIDENCE, RHODE ISLAND.

ARRANGEMENT OF SHAFTS AND PULLEYS.

SPECIFICATION forming part of Letters Patent No. 242,256, dated May 31, 1881.

Application filed March 30, 1881. (No model.)

*To all whom it may concern:*

Be it known that I, ABEL BOOTHROYD, of Providence, in the State of Rhode Island, a subject of Her Majesty the Queen of Great Britain and Ireland, have made certain new and useful Improvements in the Arrangement of Shafts and Pulleys; and I do hereby declare that the following specification, taken in connection with the drawing making a part of the same, is a full, clear, and exact description thereof.

The figure is a perspective view of my invention.

The object of my invention is to preserve the belts, shafting, and machinery from unnecessary wear and strain; and it consists in combining the shafts and pulleys in the manner hereinafter described.

In the arrangement of shafting and pulleys now in common use the belt is shifted from a fast to a loose pulley upon the counter-shaft when it is desired to stop the counter-shaft and the machinery receiving its propelling power therefrom. This subjects the belt to constant wear during the continued rotation of the main shaft and compels it, when shipped back to the fast pulley upon the counter-shaft, to suddenly take the weight of the counter-shaft and all the machinery attached thereto, thus bringing upon it a sudden and very severe strain.

In my invention, A is the main shaft, and B the counter-shaft.

C is a fast pulley, and D a loose pulley, upon the main shaft A; and E is a fast pulley, and F a loose pulley, upon the counter-shaft B.

G is a belt connecting the fast pulley C and the fast pulley E.

H is a fixed pulley upon the counter-shaft, which is connected by a belt, I, to a pulley, J, upon the machine to be operated.

When it is desired to stop the counter shaft B and the machinery driven thereby, the belt G is by means of a suitable shipper thrown off from the fast pulleys C and E and onto the loose pulleys D and F. The counter-shaft and its connections are now stopped, and also the belt G, which rests upon two loose pulleys, remains still and is saved from wear during the continued rotation of the main shaft.

When it becomes necessary to again rotate the counter-shaft the belt G is brought back by the shipper to the fixed pulleys C E; but as the belt does not come upon the fixed pulley suddenly, but gradually, it does not take the full weight of the counter-shaft and its connections at first, and the severe and sudden strain upon the belt is avoided.

What I claim as my invention, and desire to secure by Letters Patent, is—

The combination of the pulleys C D on the shaft A, belt G, and pulleys E F on the shaft B, the latter being provided with a fixed pulley, H, for the transmission of the power, arranged to operate substantially as and for the purpose described.

ABEL BOOTHROYD.

Witnesses:
 WALTER B. VINCENT,
 JOHN J. COLTON.